United States Patent
Simpson et al.

(10) Patent No.: US 7,190,467 B2
(45) Date of Patent: Mar. 13, 2007

(54) PRINT OPTION CONFIGURATIONS SPECIFIC TO A SERVICE OR DEVICE FOR PRINTING IN A DISTRIBUTED ENVIRONMENT

(75) Inventors: Shell Sterling Simpson, Boise, ID (US); Ward Scott Foster, Boise, ID (US); Kris R. Livingston, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 969 days.

(21) Appl. No.: 09/905,238

(22) Filed: Jul. 12, 2001

(65) Prior Publication Data
US 2003/0011801 A1  Jan. 16, 2003

(51) Int. Cl.
*G06F 15/00* (2006.01)
*G06K 1/00* (2006.01)

(52) U.S. Cl. .................. 358/1.1; 358/1.15; 358/1.9

(58) Field of Classification Search .............. 358/1.15, 358/1.14, 1.9; 707/525; 715/501.1; 455/557; 710/72; 400/61, 76; 714/25; 709/327
See application file for complete search history.

(56) References Cited

U.S. PATENT DOCUMENTS

| | | | | |
|---|---|---|---|---|
| 5,890,173 | A * | 3/1999 | Yoda ................... | 715/501.1 |
| 6,285,889 | B1 * | 9/2001 | Nykanen et al. ......... | 455/557 |
| 6,707,574 | B1 * | 3/2004 | Freeman et al. ......... | 358/1.9 |
| 6,739,771 | B2 * | 5/2004 | Kawaoka .............. | 400/61 |
| 6,788,427 | B1 * | 9/2004 | Okigami .............. | 358/1.15 |
| 6,891,635 | B2 * | 5/2005 | Dutta .................. | 358/1.15 |
| 6,938,202 | B1 * | 8/2005 | Matsubayashi et al. .. | 715/501.1 |
| 2001/0034747 | A1 * | 10/2001 | Fujitani et al. ......... | 707/525 |
| 2002/0010806 | A1 * | 1/2002 | Yamade ............... | 709/327 |
| 2002/0036793 | A1 * | 3/2002 | Roosen et al. ......... | 358/1.15 |
| 2002/0059489 | A1 * | 5/2002 | Davis et al. ........... | 710/72 |
| 2002/0090240 | A1 * | 7/2002 | Lively ................. | 400/76 |
| 2003/0110412 | A1 * | 6/2003 | Neville ................ | 714/25 |
| 2005/0024677 | A1 * | 2/2005 | Miura et al. ........... | 358/1.15 |

OTHER PUBLICATIONS

HP LaserJet 4050, 4050T, 4050N, and 4050TN Printers User's Guide, Hewlett-Packard Company, 1999, cover page, title pages and pp. xv-xix, and 60.
Internet Reference "HP LaserJet 1100 and 2100 Printer Families—Explanation of Quick Sets", http://www.hp.com/cgi-bin/cposupport/printerfriendly.cgi?in=printers/support_doc/bp106693, printed Jun. 27, 2001, 2 pages.

* cited by examiner

*Primary Examiner*—Kimberly Williams
*Assistant Examiner*—Satwant Singh

(57) ABSTRACT

A user can select one or more print options corresponding to a particular printer and associate the set of selected options with a particular name. The user can then identify the set of selected options, by name, when printing to that particular printer, even though no printer driver for the printer is installed on the user's computing device. Additionally, one or more print options to be used in printing a document identified in a print request can be automatically selected based on one or more characteristics of the print request.

27 Claims, 12 Drawing Sheets

PRINT OPTION CONFIGURATIONS SPECIFIC TO A SERVICE OR DEVICE FOR PRINTING IN A DISTRIBUTED ENVIRONMENT

TECHNICAL FIELD

This invention relates to printing and distributed environments, and more particularly to print option configurations specific to a service or device for printing in a distributed environment.

BACKGROUND

As computer technology has advanced, the role of computers in our daily lives has expanded, as has the need for various peripheral or supporting devices. One typical peripheral device used with computers is a printer, which generates a hard copy of data that is used by the computer. The types and capabilities of printers available has similarly been expanding, resulting in a wide variety of printers with a range of printing capabilities, performance, and price.

One significant expansion in the use of computer technology is the networking of computers together. Networking computers together allows the computers to communicate with one another as well as with other devices, such as printers. Currently, in order for a user of a computer to print to particular printers on a network, software must be installed on the computer that allows it to configure the printer for printing and communicate print requests to the printer. Such software is commonly referred to as a "printer driver". A different printer driver is typically required for each different type (e.g., make and model) of printer that the user desires to print to. This can create many problems for a user—the user (or an administrator) must spend the time and effort to install the printer driver on the user's computer for each type of printer that the user will print to, the user is not able to move to another computer and print from that computer unless the correct printer drivers have been installed on the other computer, and so on.

It would thus be beneficial to provide a way to improve the user's ability to configure printers in a user-friendly manner. The importance of such an improvement increases as the use and capabilities of networks continues to expand.

SUMMARY

Print option configurations specific to a service or device for printing in a distributed environment are described herein.

According to one aspect, a user can select one or more print options corresponding to a particular printer and associate the set of selected options with a particular name. The user can then identify the set of selected options, by name, when printing to that particular printer, even though no printer driver for the printer is installed on the user's computing device.

According to another aspect, one or more print options to be used in printing a document identified in a print request are automatically selected based at least in part on one or more characteristics of the print request. The user's history of print requests and print options selected for those requests may also be maintained, allowing the automatic selection of print options to be further based on the user's previous print option selection(s).

DETAILED DESCRIPTION

Print option configurations specific to a service or device for printing in a distributed environment are described herein. Various print options for a particular service or device can be selected as a set or configuration and assigned a name by a user via a service in the distributed environment. The service makes such print options available for selection even though the computing device being used by the user has no printer driver installed for the particular service or device. The print options in a particular set or configuration can then be identified, by name, to configure the particular service or device for subsequent printing. Additionally, a set of print options may automatically be selected by the particular service or device based on various characteristics of a print request (e.g., the name of the document being printed).

Print options serve to configure a printer in a particular manner for printing. Each print option used to configure a printer affects how the printer will print documents it receives, and/or how it will pre-process (or post-process) the document to be printed (or already printed). These print options are typically applied regardless of the underlying data in the document being printed and the format of such data (e.g., its font, color, etc.). A wide variety of print options are commonly known, and include, for example, duplex or single-sided printing, automatic conversion of document to the size of paper in the printer (or a particular tray of the printer), automatic stapling of the printed document, the type of stapling (e.g., saddle staple), collation of the printed document, a number of copies of the document to print, a print quality of the document, a particular print media source (e.g., a manual input tray on the printer), selection of a watermark, binding options, cutting options, and so forth.

Figure 1:
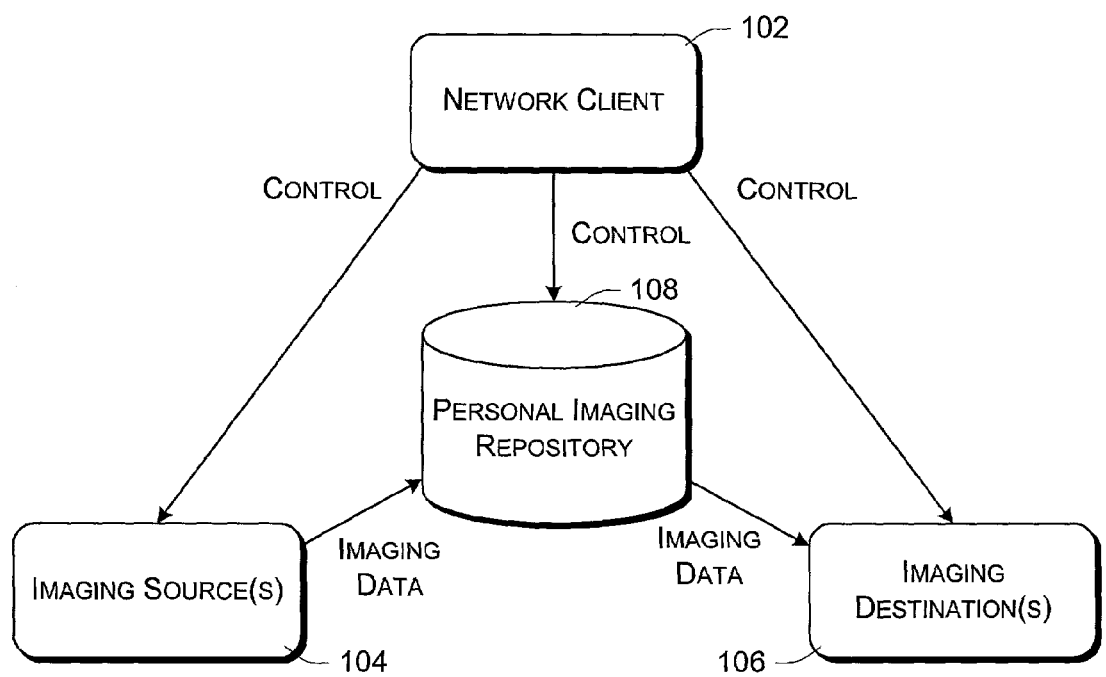
FIG. 1 illustrates an exemplary distributed system in which print option configurations can be used.

FIG. 1 illustrates an exemplary distributed system 100 in which print option configurations can be used. In system 100, a network client device 102 is in communication with one or more imaging sources 104, one or more imaging destinations 106, and a personal imaging repository 108. A user of client device 102 can communicate with imaging source(s) 104 to select or identify images to be stored in personal imaging repository 108. Imaging sources 104 represent any of a wide variety of devices that are capable of providing images to other devices. Examples of imaging sources 104 include computers, cameras (e.g., digital still or video cameras), scanners, applications, web sites, and so forth.

Repository 108 represents image storage facilities personalized to the individual user, although alternatively multiple users may have access to the same repository 108. Repository 108 is maintained on one or more computers, such as network client 102, an imaging source(s) 104, an imaging destination(s) 106, another computer (not shown), or combinations thereof. The "images" or "graphics" in repository 108 can be any type of printable data, such as text, drawings, frames of video or animations, pictures, combinations thereof, and so forth.

The user, via network client 102, can select images from imaging repository 108 to be communicated to imaging destination(s) 106 for printing in accordance with print option configurations identified by the user. Imaging destination 106 represents any of a wide variety of devices that are capable of processing images in some manner. Examples of imaging destinations 106 include printers, plotters, services managing printing devices, and so on.

Figure 2:
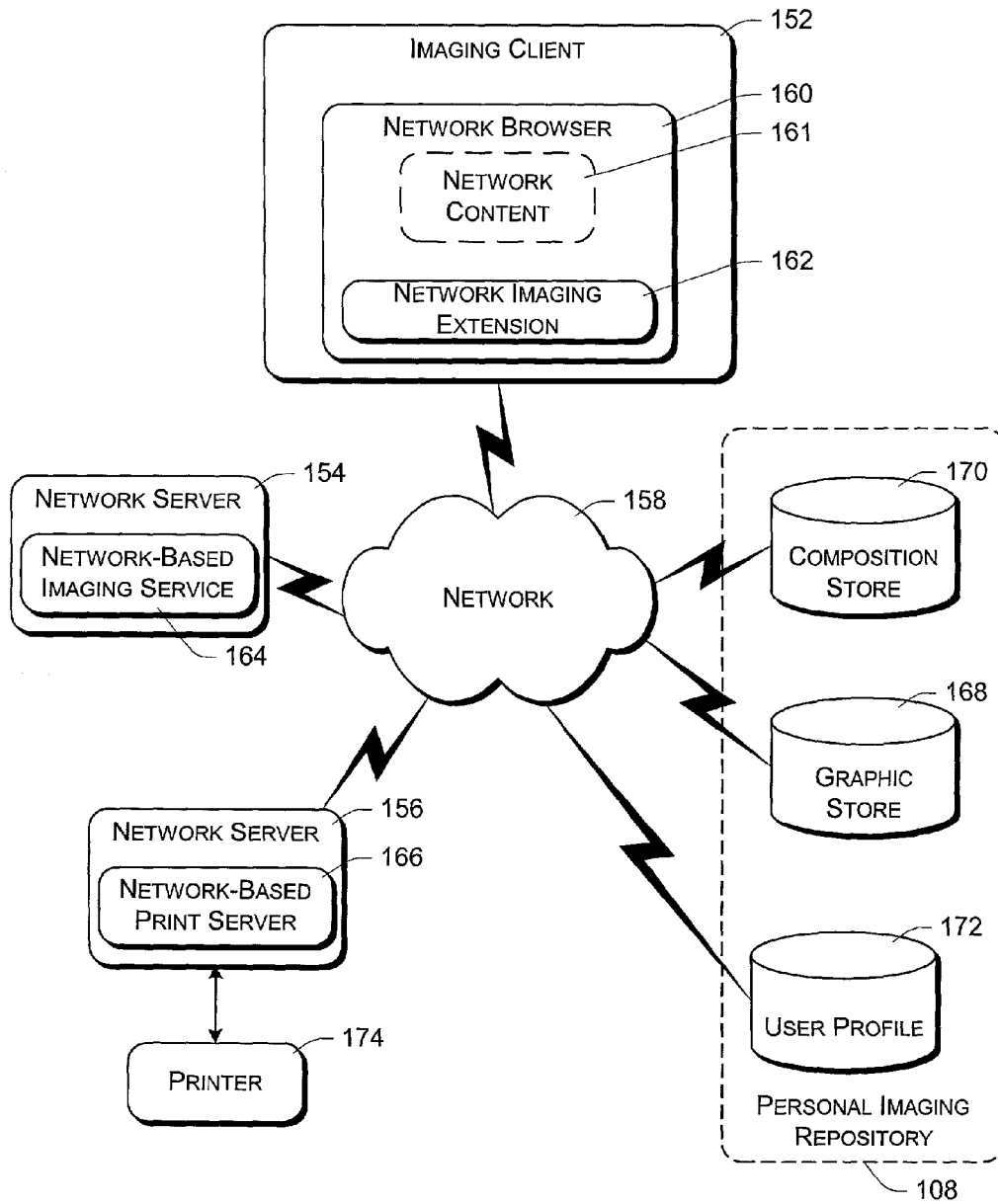
FIG. 2 illustrates an exemplary distributed system illustrating the use of print option configurations in a distributed environment in additional detail.

FIG. 2 illustrates an exemplary distributed system 150 illustrating the use of print option configurations in a distributed environment in additional detail. System 150 includes an imaging client 152 coupled to multiple network servers 154 and 156 via a network 158. Client 152 and servers 154 and 156 represent any of a wide variety of conventional wired and/or wireless computing devices, such as desktop computers, portable computers, dedicated server computers, multi-processor computing devices, cellular telephones, personal digital assistants (PDAs), handheld or pen-based computers, gaming consoles, and so forth.

Network 158 represents one or more conventional data distribution networks that can be used to communicate data and other information (e.g., control information) between or among various computing devices. Examples of network 158 include the Internet, a local area network (LAN), a public or private wide area network (WAN), combinations thereof, and so on. Network 158 can include multiple different types of networks, including wired and/or wireless portions, employing any of a wide variety of different communications protocols, including public and/or proprietary communications protocols.

During operation, a network browser 160 executing on imaging client 152 allows a user of client 152 to interact with network servers 154 and 156, as well as network services executing on such servers. Network browser 160 includes a network imaging extension 162 that allows network content 161 executing in browser 160 to communicate with the user's personal imaging repository 108, which may include communication with services via network 158. As used herein, services refer to software components that can execute on one or more computing devices and are accessible to provide functionality to imaging client 152, such as imaging sources, imaging destinations, printer configuration components, and so forth. Network imaging extension 162 can be implemented in any of a wide variety of manners, such as an application programming interface (API) providing methods that can be called by content 161 and used to interact with servers 154 and 156 (e.g., to load, save, modify, delete, etc. documents).

Network server 154 executes a network-based imaging service 164 that allows a user of browser 160 to interact with his or her personal imaging repository (e.g., add, remove, and/or modify graphics in the repository) and identify an image for printing. Images identified or selected for including in the user's personal imaging repository can be indicated by value (e.g., the actual image data) or by reference (e.g., a pointer to or identifier of the image stored elsewhere). The network-based imaging service 164 also allows a user to identify configurations (of pre-defined print options) for the printer(s) on which the image will be printed. The image to be printed can be made up of graphics from one or more different graphic sources, and include any type of printable data (e.g., text, graphics, and so forth).

Network-based imaging service 164 represents one or more services accessible to imaging client 152. Each service can execute on the same server or alternatively on multiple different servers. These different services can provide different functionality (e.g., one service may be responsible for graphic storage and retrieval functionality, while another service is responsible for merge functionality allowing graphics to be merged together). Additionally, some services may be fully or partially overlapping in functionality provided by other services, allowing a degree of fault-tolerance to be built into system 150 (e.g., one service can take over the responsibilities of another if the other fails).

The graphic for an image is received from a graphic store 168 and/or a composition store 170. Graphic store 168 stores individual graphics (also referred to as documents or more generally data capable of being represented as a two dimensional graphic), such as individual files. These individual graphics in store 168 can be used as individual printable images via imaging service 164. Each individual graphic can be any of one or more types of printable data (e.g., text, pictures, etc.), and may result in multiple hard copy pages when printed. Additionally, a user of browser 160 may identify multiple individual graphics from graphic store 168 that are to be compiled together as a single image for printing. In this situation, network-based imaging service 164 provides an interface that allows the user of browser 160 to select different individual images and store the compilation of individual images as a single composition document (also referred to as a composition image) in composition store 170. The composition document may include the actual data from the individual images, or alternatively identifiers (e.g., file name and path, or Uniform Resource Locators (URLs)) of where the individual images can be retrieved for printing or displaying to the user.

Graphic store 168 and composition store 170 are illustrated in system 150 as two separate stores. Alternatively, multiple such stores may exist in system 150, and one or more graphic stores may be combined with one or more composition stores. Additionally, one or more of these stores 168 or 170 may be implemented on one of servers 154 or 156, and/or imaging client 152.

Network-based imaging service 164 also provides an interface via which a user of browser 160 can define print option configurations and subsequently select those configurations. These configurations defined by a user are stored at server 154, or alternatively elsewhere in system 150, such as in user profile 172 or at client 152. Any number of configurations can be defined by the user. Each configuration (also referred to as a "set") is a grouping of one or more print options that are selected by the user. Each print option also has an associated setting, which may be explicitly or implicitly supplied by the user. For example, if the user selects the "duplex" option then the user has implicitly assigned a setting of "on" to duplex printing (and also possibly "off" to single-sided or simplex printing). However, if the user desires to select the number of copies to be printed, then the user explicitly supplies the setting (that is, explicitly identifies the number of copies to be printed). The user is able to define a printer configuration at any time by accessing (e.g., browsing to) a service associated with a printer that the printer configuration corresponds to. No printer driver for the printer need be installed on client 152. The definition and subsequent selection of printer configurations is discussed in more detail below.

In order to print an image, the user identifies the image (optionally selecting graphics that are to be part of the image) and any printer configuration(s) he or she desires via network-based imaging service 164. If the optional selecting of graphics is performed, it may be performed by the same network service as performs the printer configuration identification, or alternatively a different service. A print request, including the image data and user-selected printer configuration, are then communicated to network-based print server 166 executing on network server 156. Upon receipt of the print request, network-based printer server 166 interacts with a printer 174 coupled thereto to produce a hard copy of the image in accordance with the received printer configuration.

Alternatively, rather than identifying a particular print option configuration when printing, print server 166 may automatically select a print option configuration based on one or more characteristics of the print request (e.g., the name of an image to be printed). This automatic determination can be made based on a set of rules accessible to print server 166, such as preprogrammed rules, user-supplied rules, rules learned by print server 166 based on previous print requests, and so forth.

Figure 3:
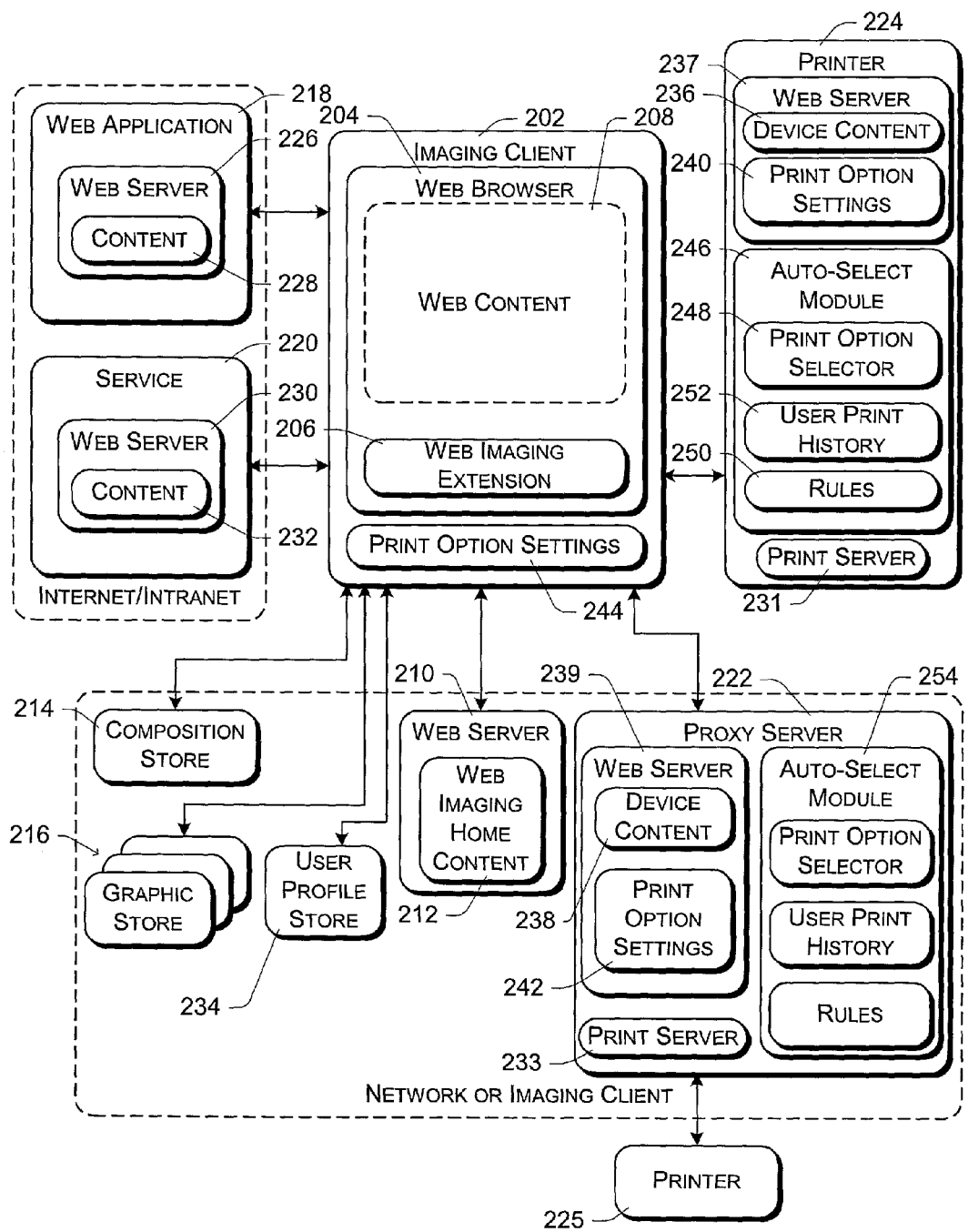
FIG. 3 illustrates an exemplary web-based architecture in which printer option configurations can be used.

FIG. 3 illustrates an exemplary web-based architecture 200 in which printer option configurations can be used. Web-based architecture 200 refers to the World Wide Web (or simply the Web), which is a distributed collection of interlinked, user-viewable documents (typically referred to as Web documents or Web pages) that are accessible via the Internet. The Web also refers to the client and server components which provide user access to such documents using standardized Internet protocols. Currently, the primary standard protocol for allowing applications to locate and acquire Web documents is the HyperText Transport Protocol (HTTP), and the Web pages are encoded using a standard markup language such as the HyperText Markup Language (HTML) or eXtensible Markup Language (XML). Alternatively, other protocols or languages may be used.

In architecture 200, an imaging client 202 (e.g., imaging client 152 of FIG. 2) includes a web browser 204 including a web imaging extension 206. Browser 204 is able to load and execute web content 208 (e.g., JavaScripts, Java applets or other web programs) from various sources. In the illustrated example, web browser 204 establishes a communication channel or connection with web server 210, causing web imaging home content 212 to be copied to imaging client 202 as at least part of web content 208. Although illustrated as being copied from web server 210, it is to be appreciated that web imaging home content 212 could alternatively be loaded from a local or intermediary source, such as a cache (not shown) implemented on imaging client 202. Additionally, any inputs by the user to web content 208 are typically handled by web content 208 rather than being returned to web imaging home content 212.

Once loaded in web browser 204, web content 208 can communicate, via web imaging extension 206, with other components in architecture 200, allowing access to a personal imaging repository as well as imaging sources and imaging destinations. In the illustrated example, the personal imaging repository includes composition store 214 and graphic store 216, the imaging sources include web application 218 and service 220, and the imaging destinations include proxy server 222 and printer 224. Web application 218 includes a web server 226 that maintains (or obtains/creates) content 228 accessible to web content 208. Similarly, service 220 maintains a web server 230 that maintains (or obtains/creates) content 232 accessible to web content 208. The content 228 and 232, when generated (e.g., from a file or dynamically) and executed on imaging client 202 (e.g., as part of web content 208), can make various functionality available to web content 208, such as image sources, combine multiple graphics into a composition document, etc.

Printer 224 and proxy server 222 each optionally include a print server 231 and 233 for queuing and managing received print requests, and a web server 237 and 239 storing or dynamically generating device content 236 and 238, respectively. Device content 236 represents content (which may be generated dynamically) that is provided to the web browser 204 by the web server 237. Device content 236 is a web service available to imaging client 202 (e.g., displayed as a web page) that represents printer 224 and that can access the user's personal imaging repository. The device content 236, when downloaded and executed on client 202 (e.g., as part of web content 208), can access the stores 214 and 216 via web imaging extension 206 to obtain graphics and upload the graphics to printer 224 for printing, as well as allow a user to define print option configurations for printer 224. The printing is then handled by a module (e.g., print server 231) of printer 224, without requiring any printer driver for printer 224 to be installed at client 202. The upload to printer 224 is accomplished using existing conventional mechanisms (e.g., TCP/IP sockets and/or HTTP POST command(s)) that allow content executing within the browser to communicate with the server from which that content came. In the illustrated example, imaging extension 206 is only used to obtain graphics from the personal imaging repository, not to upload the graphics to the printer.

Proxy server 222 allows a printer(s) that does not host a web server to be represented by a web service. Proxy server 222 includes device content 238 and web server 239, which operate analogous to device content 236 and web server 237, respectively. The printer 225 is represented by device content 238 and graphics obtained by the device content 238 (presented in the context of the device). This device content, when downloaded and executed on client 202 (e.g., as part of web content 208), can upload graphics accessed through the imaging extension to proxy server 222, which in turn forwards these graphics to printer 225.

Print option configurations defined by a user are stored as print option settings at the printer (or service) corresponding to the configuration(s). For example, print option configurations defined by a user for printer 224 can be stored as print option settings 240, while print option configurations defined by a user for printer 225 can be stored as print option settings 242. The print option settings 240 and 242 can include multiple configurations for each potential user of the corresponding printer, as well as configurations for multiple users of the printer. The identity (e.g., a user name) of the user is thus made available to the printer 224 or server 222 to allow identification of the configuration(s) defined by that user. The identity of the user can be made available in a wide variety of different manners, such as a printer log-on process where the user provides his or her name to the printer or service, or device content 236 (or 238) may, when executed by browser 204, query an operating system executing on imaging client 202 to obtain the identity of the current user logged on to client 202.

Alternatively, print option configurations may be stored elsewhere in architecture 200. For example, print option configurations may be stored locally on imaging client 202 as print option settings 244. These settings can be stored in any of a variety of manners that make them accessible to printer 224 and/or server 222. In one implementation, print option settings 244 can be stored as one or more conventional "cookies" associated with the corresponding printer 224 or server 222, so that browser 204 communicates the content of the cookie(s) associated with printer 224 (or server 222) to printer 224 (or server 222) when the user browses to printer 224 (or server 222). In another implementation, print option settings 244 are stored by web imaging extension 206 (e.g., in the local file system of client 202).

Additionally, printer 224 may also include an optional auto-select module 246 to automatically select a print option configuration for a particular print request based on one or more characteristics of the print request. Auto select module 246 includes a print option selector 248, one or more rules 250, and an optional user print history 252. During operation, when printer 224 receives a print request, print option selector 248 analyzes the print request to obtain one or more characteristics of the print request. Print option selector then applies rules 250 to the characteristic(s) of the print request, and optionally also applies user print history 252, in order to determine a particular one of print option configurations in settings 240 to apply to printer 224 when printing the requested image. Alternatively, print option selector 248 may identify a particular grouping of print options that are to be used when printing the requested image even though the grouping does not apply to a particular configuration in settings 240.

Rules 250 map one or more characteristic patterns to a particular print option configuration. Alternatively, rules 250 may map one or more characteristic patterns to a particular set of one or more print options that do not have any corresponding configuration name. Any characteristic that can be obtained from a print request can be used as the basis of a rule 250. By way of example, a particular rule may map any print request for an image with a name including the characters "final" to a print option configuration that includes a print quality of "high", or an image with a name including the characters "photo" or "jpg" to a print option configuration that includes a print quality of "photo", or an image with a name including the characters "patent" to a print option configuration that includes settings of "duplex" and "stapled". By way of additional examples, a particular rule may map any print request for an image greater than a particular size to a print option configuration that includes a print quality of "draft", or any document of more than a threshold number of pages in "duplex".

Alternatively, the one or more characteristic patterns may identify the source application that printed the document. The source application may be explicitly identified in the print request to print the document, or alternatively may be inherent in the print request (e.g., the currently running application when a connection to the web page for the printer was established). For example, a particular rule may map any print request from a web browser (or a particular brand of web browser) to a print option configuration that includes a print quality of "draft", so that any document printed from that web browser is printed in draft quality. By way of another example, a particular rule may map any print request from a spreadsheet application to a print configuration that includes a color setting of "monochrome".

The rules 250 can be defined in any one or more of a variety of manners. For example, the rules may be pre-programmed by a manufacturer or administrator of printer 224. Alternatively, rules may be defined by individual users. In this situation, device content 236, when downloaded to client 202 and executed by browser 204, allows the user of browser 204 to input particular rules.

Print option selector 248 may also automatically generate one or more rules 250 based on user print history 252. This automatic generation can be performed in response to a received print request, or alternatively at other times (e.g., during printer 224 idle time). The rules generated by selector 248 may be stored as rules 250 for subsequent use, or alternatively may be generated and used on-the-fly in response to a print request and then discarded. Whether to store rules generated by selector 248 as rules 250 may be pre-programmed in selector 248, or alternatively may be a user-definable parameter, or alternatively selector 248 ask the user whether he or she would like to add the new rule to rules 250.

Selector 248 stores, in user print history 252, the characteristics it obtains from each print request along with the particular print option configuration (by name and/or by individual print options) used when printing that print request. For example, a particular rule 250 may cause selector 248 to select a print configuration that includes duplex printing. However, the user may override that print option prior to printing. In this situation, the use of the simplex print option (and optionally the fact that the setting of duplex was overridden by the user), is stored in print history 252. Print option selector 248 can subsequently analyze user print history 252 to identify patterns and generate rule(s) based on the identified patterns. For example, there may be no rule 250 previously defined that maps the characters "jpg" in an image name to a particular print configuration. However, selector 248 may determine that the user has previously requested the printing of twenty different images including the characters "jpg" and each time has requested that the images be printed with a print quality of "photo". Thus, in response to the next request for printing of an image including the characters "jpg", selector 248 automatically selects a print configuration that includes a print quality of "photo". The print configuration thus selected by 248 may be a pre-existing configuration, or alternatively a newly defined (by selector 248) configuration (e.g., a configuration with the print quality set to "photo" and all other print options (e.g., number of copies, stapling, etc.) set to some default value).

Additionally, the selector 248 may begin with a default set of print options for a print request and then override individual settings in the default set based on history 252. For example, selector 248 may notice that the user requested two copies in greater than 50% of the history when the document name ended with "JPG" and the document length was one page. This may cause selector 248 to change the copy count to 2 whenever the document name ends with "JPG" and the length is one page, but not to change any other of the default settings as a result of this rule. Other rules could be applied independently for this print request, which may cause other individual settings to be altered before the resulting configuration is presented to the user for final approval.

Proxy server 222 may also include an auto-select module 254 that operates analogous to auto-select module 246, except that it represents a separate printer 225 rather than being included as part of a printer.

Web application 218 and service 220 may each be accessible by imaging client 202 via the Internet or via a local network (e.g., an Intranet). Each of the stores 214 and 216, as well as user profile store 234, web server 210, and proxy server 222, may be accessible via a network (e.g., an Intranet or the Internet) and/or located on imaging client 202.

During operation, web content 208 generates and renders, via web browser 204, one or more user interfaces (e.g., graphical user interfaces (GUIs)) that allows the user to interact with his or her personal imaging repository. This interaction includes allowing the user to select images or documents for printing, to identify pre-defined printer configurations to be used in printing selected documents, and to define printer configurations. Example user interfaces rendered by web content 208 are discussed below with reference to FIGS. 4–8. The various interfaces can be separate web pages, or alternatively portions of another (or the same) web page.

Figure 4:
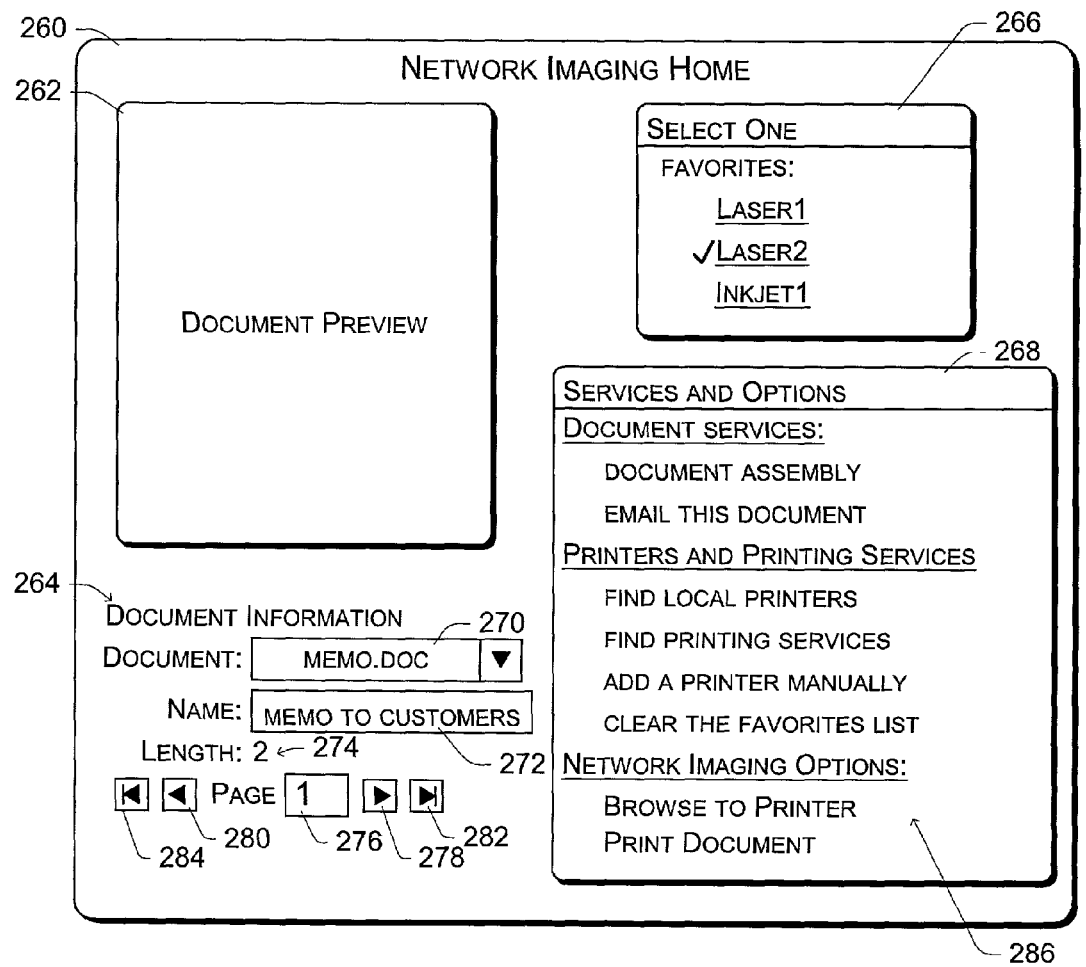
FIG. 4 illustrates an exemplary user interface presented by a web browser.

FIG. 4 illustrates an exemplary user interface presented by web browser 204 of FIG. 3. In the illustrated example, user interface 260 is displayed by web browser 204 as a result of loading the web imaging home content 212. User interface 260 includes a document preview window 262, a document information portion 264, a favorite printers portion 266, and a services and options portion 268. User interface 260 allows the user to select one or more documents for printing via document information portion 264. The user can select the desired document by name via a pull down menu input 270 or change the name of the selected document in name field 272. Alternatively, other document-selection input mechanisms may be supported, such as cutting and pasting of the document name, dragging and dropping an icon representing the document, supporting a "browse" feature allowing the user to search his or her personal imaging repository (or elsewhere) for documents, and so forth.

The length of the user-selected document (e.g., in pages) is illustrated in a length field 274. Document preview window 262 provides a location via which a small preview image of the document selected for printing (or other processing) is displayed to the user. A current page section 276 identifies the current page(s) being displayed in document preview window 262, and page manipulation buttons 278, 280, 282, and 284 allow the user to easily advance to the next page in the document, the previous page in the document, the last page of the document, or the first page of the document, respectively.

Favorite printers portion 266 identifies one or more printers that are selectable by the user for printing, and can include, for example, the user's preferred printers, suggested printers to be used by the user, default printers, and so forth. In the illustrated example, each printer identified in favorites portion 266 is identified by a hyperlink (illustrated as being underlined). The user can select one of the printers that the identified document is to be printed on by activating the hyperlink (e.g., by using a pointer control device to situate a pointer over the hyperlink on screen and click a button of the control device). Additionally, selecting the hyperlink of a printer in portion 266 accesses a web page for that printer, allowing the user to define printer configurations and assign names to those configurations.

Services and options portion 268 allows the user to identify or request options or services, such as to add a printer to favorites portion 266, clear favorites portion 266, print the document, and so forth.

One option that can be selected by the user via portion 268 is the browse to printer option 286, which allows the user to access web pages for printers that are not listed in portion 266 (and optionally those printers listed in portion 266, although accessing them via portion 266 is more user-friendly). Selection of the browse to printer option 286 allows the user to select a particular printer (e.g., by user input of the printer name or Uniform Resource Locator (URL) to identify the printer or print service, or by displaying to the user a directory or listing (e.g., via a web page) of available printers) to be browsed to in order to define printer configurations and assign names to those configurations. When the user subsequently requests to print a document, he or she can identify one of the printer configurations to apply for the printing, causing the options identified in that configuration to be used in printing the document. Each of these configurations includes a setting of one or more print options.

Figure 5:
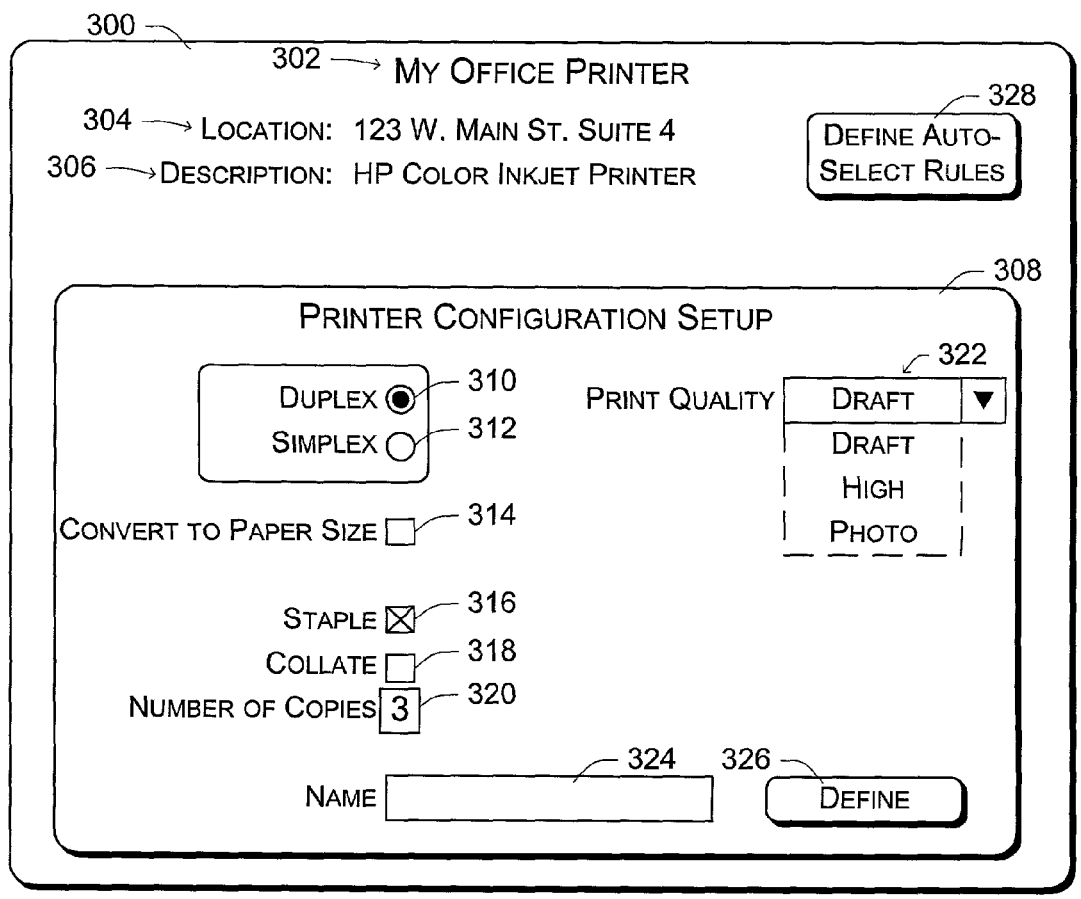
FIG. 5 illustrates an exemplary printer configuration setup user interface.

FIG. 5 illustrates an exemplary printer configuration setup user interface 300. Interface 300 includes the name 302 of the printer, a physical location 304 of the printer, and a description 306 of the printer. Interface 300 is presented to the user when he or she browses to the printer or service representing the printer, such as by selection of one of the hyperlinks in portion 266 in FIG. 4, or by entering the URL of the printer or service into web browser 204 of FIG. 3.

Interface 300 also includes a printer configuration setup portion 308. Various print options are displayed to the user in setup portion 308, including a print duplex option 310, a print simplex option 312, a convert document to paper size option 314, a staple option 316, a collate option 318, a number of copies option 320, and a print quality option 322. Various graphical user input mechanisms may be employed to allow selection of the print options, such as conventional radio buttons (e.g., as used with options 310 and 312), conventional check boxes (e.g., as used with options 314–318), data-entry fields allowing the input of alphanumeric characters (e.g., as used with option 320), pull-down menus (e.g., as used with option 322), and so forth. The various options may be independent, or alternatively inter-related. For example, print duplex option 310 and print simplex option 312 may be mutually exclusive, so that only one can be selected (e.g., selection of one of the options 310 or 312 causes the other to be automatically de-selected). Which option is currently selected is indicated by a solid circle within the hollow circle of the option (e.g., option 310 is selected in FIG. 5). It is to be appreciated that these details are only exemplary, and may differ between computing platforms. Additionally, certain options (such as options 310 and 312) can be grouped together (e.g., a box around the options and their corresponding descriptive text) to separate them from other options or option groupings and reduce the possibility of user-confusion.

Setup portion 308 also allows the user to assign a name or other identifier to the selected options by typing in a name in data-entry field 324. Data-entry field 324 is a conventional data input mechanism, allowing user-input of one or more alphanumeric characters. Once the user has entered the name and his or her desired print options, these can be saved as a particular configuration by user-selection of a define button 326 (e.g., a conventional onscreen button). These saved configurations can be stored in a variety of different locations, as discussed above.

Interface 300 also includes a "define auto-select rules" button 328. User-selection of button 328 results in presentation of an additional interface via which the user can define rules to be used by an auto-select module of (or associated with) the printer identified in interface 300 (e.g., an auto-select module 246 or 254 of FIG. 3).

Figure 6:
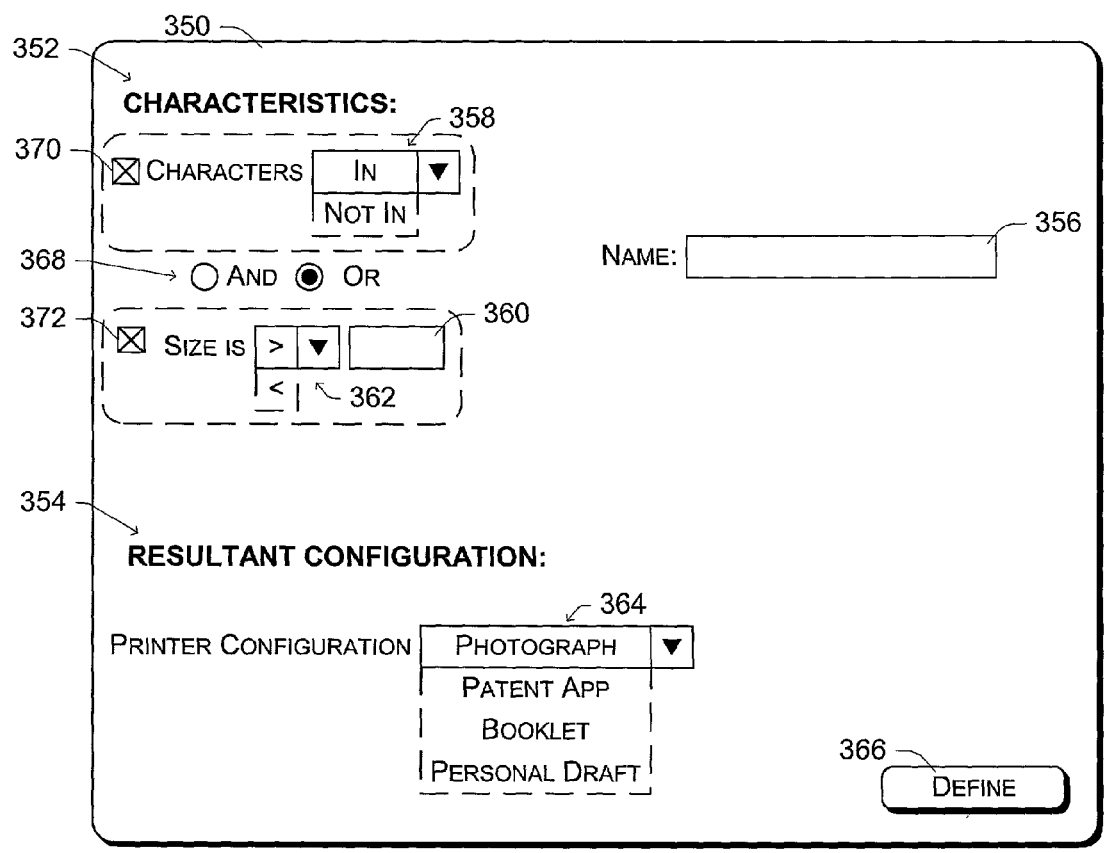
FIG. 6 illustrates an exemplary user interface allowing a user to define rules for an auto-select module.

FIG. 6 illustrates an exemplary user interface 350 allowing the user to define rules for an auto-select module. Interface 350 includes two portions: a characteristics or conditions portion 352, and a result portion 354. Characteristics portion 352 allows the user to identify particular characteristics of print requests, and result portion 354 allows the user to identify a particular print option configuration (by name) that is to be used to print an image having the characteristics identified in portion 352. A wide variety of conventional user-interface techniques can be used to allow the user to input characteristics in portion 352 as well as identify a print option configuration in portion 354. In the illustrated example, the user can enter into a data input field 356 particular characters that may be included in the name of an image to be printed, and then select from a pull-down menu 358 whether the input characters are to be included in the image name or not included in the image name. Additionally, the user can enter into a data input field 360 a particular size and then select from a pull-down menu 362 whether the image is to be greater than or less than the input size. A set of radio buttons 368 associated with "and" and "or" labels allows the user to identify whether both or only one of the two characteristics (input characters and size) need be satisfied for the rule to be triggered and the identified print option configuration applied. Additionally, each of the characteristics is associated with a checkbox 370 or 372 that allows the characteristic to be enabled or disabled for the rule being defined. Also in the illustrated example, a pull-down menu 364 allows the user to select from all of the print option configurations that he or she has previously defined for this printer. Once the characteristics and print options configuration have been selected by the user, the newly defined rule can be saved by user-selection of a define button 366.

Additional user interfaces (not shown) may also be included for selecting, ordering, deleting, and otherwise managing rules defined by the user. The rules can be displayed in any of a wide variety of manners, such as an alphabetical list, a chronological list by creation date (or date the rule was last applied), and so forth. Via such additional interfaces, rules could be selected and edited (e.g., characteristics defined in the rules changed, the name of the rules changed, etc.), rules may be set as "active" (and thus able to be applied by a print option selector) or "inactive" (and thus not able to be applied by a print option selector), rules may be arranged in a particular order so that a particular one or more rules are applied by a print option selector before other rules, and so forth.

Figure 7:
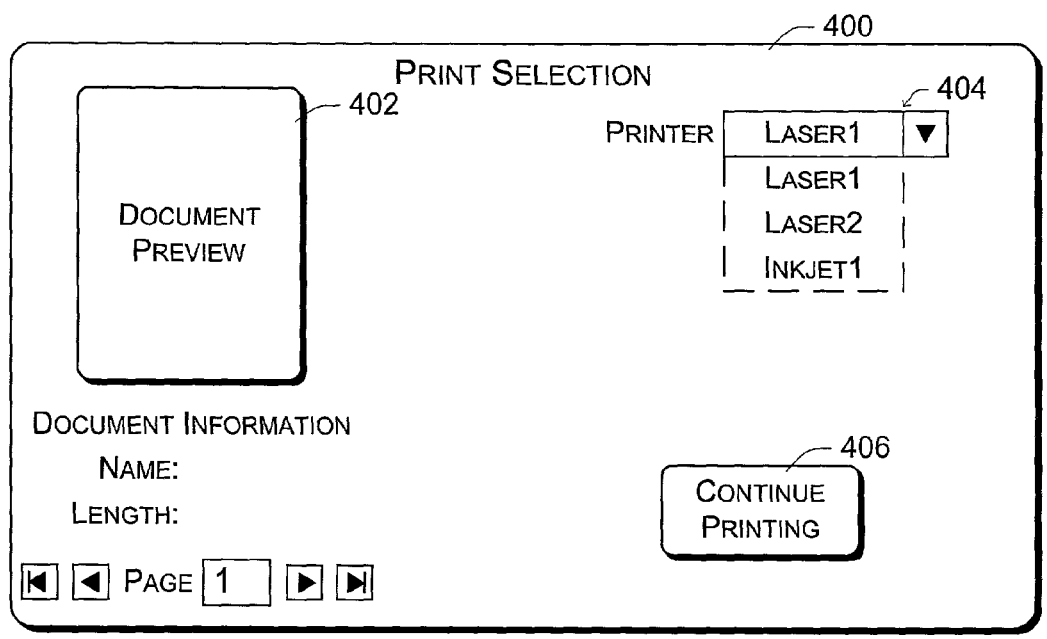
FIG. 7 illustrates an exemplary user interface that is displayed in response to a print request by a user.

FIG. 7 illustrates an exemplary user interface 400 that is displayed in response to a print request by a user (e.g., by selection of a print document option in services and options 268 of FIG. 4). A document preview window 402 is displayed in interface 400, allowing the user to view a page(s) of the document to be printed (analogous to document preview window 262 of FIG. 4). The user is further able to select a printer on which the document is to be printed via a pull-down menu 404. Once the printer has been selected, the user can proceed to the next step in the print process by selecting a "continue printing" button 406.

Figure 8:
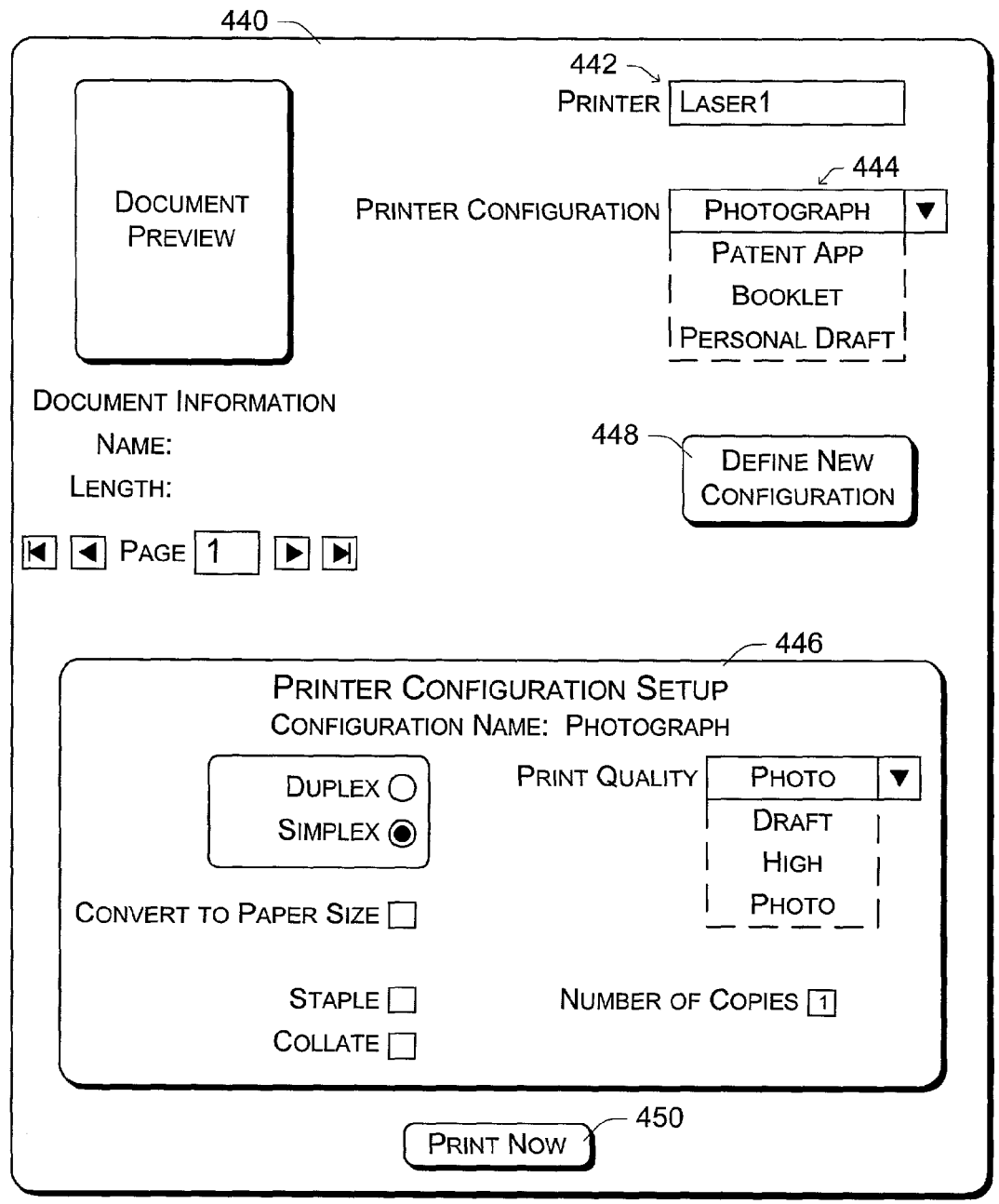
FIG. 8 illustrates an exemplary user interface that is displayed after the user has selected a particular printer from the interface of FIG. 7.

FIG. 8 illustrates an exemplary user interface 440 that is displayed after the user has selected a particular printer and the print button 406 of FIG. 7. Interface 440 includes a document preview window and document information analogous to interface 400. Additionally, interface 440 includes an identification 442 of the selected printer as well as the available print option configurations (by name) via a pull-down menu 444. A portion 446 also displays the print options associated with the currently selected print option configuration from menu 444, thereby presenting to the user an indication of exactly which print options will be used when printing and allowing the user to override any of those print options. In the event that one or more print options are overridden, an additional "define new configuration" button 448 may optionally be displayed in interface 440 to allow the user to define the new set of print options as a new configuration. Selection of button 448 results in another interface being displayed that allows the user to input the name of the new configuration (such as interface 300 of FIG. 5). Alternatively, the portion 446 need not be displayed to the user. Once the print option configuration has been selected, the user can cause the document to be printed by selecting a print button 450.

Returning to FIG. 3, the process of printing a document in system 200 can be seen from the following example. Via the interface provided by web browser 204 and content 208, the user is able to access images from different imaging sources, such as web application 218, service 220, graphic store 216, or composition store 214. The user can select a printer on which to print the selected document, such as printer 225 coupled to proxy server 222, or printer 224, and then select one of the print option configurations associated with that printer (alternatively, the print option configuration may be automatically selected by the printer). When the user proceeds with printing (e.g., print button 450 of FIG. 8), an identification of the document is communicated to the appropriate printer. An identification of the selected print option configuration is also communicated to the printer if the printer is not already aware of it. Upon receipt of the print request, the printer prints the requested document, applying all of the requested print options in the configuration.

The print request communicated to the printer includes an identifier of the document that is to be printed. Any of a wide variety of identifiers can be used, such as a URL. This may be an identifier of a single document (e.g., a document in graphic store 216), or an identifier of a composition document (e.g., a document in composition store 214) that itself includes identifiers of one or more other documents. Alternatively, the data of the document to be printed may be communicated to the printer from the client 202, such as by the device content 236 of FIG. 3 (when downloaded and executed on the client 202). The data of the document may be communicated with the print request, or alternatively subsequent to the print request.

It should be recognized that the aforementioned method of printing is exemplary. The description above describes a printing process using a personal imaging repository accessed through an imaging extension. There are other means of printing documents using web-based techniques that do not involve an imaging extension or personal imaging repository. For example, it is possible to use a file upload mechanism existing in many browsers to upload the document to be printed to the web service representing the printer. This file upload mechanism is an alternative to automatically accessing the document through the imaging extension. Once the document to be printed is available to the web service representing the printer, the web service may allow the user to select the desired option configuration, automatically select an option configuration, allow the user to define a new option configuration, or gather information for automatic selection. In other words, the web service provides the same sorts of capabilities described in the case where an imaging extension is used to obtain access to the print data.

Figure 9:
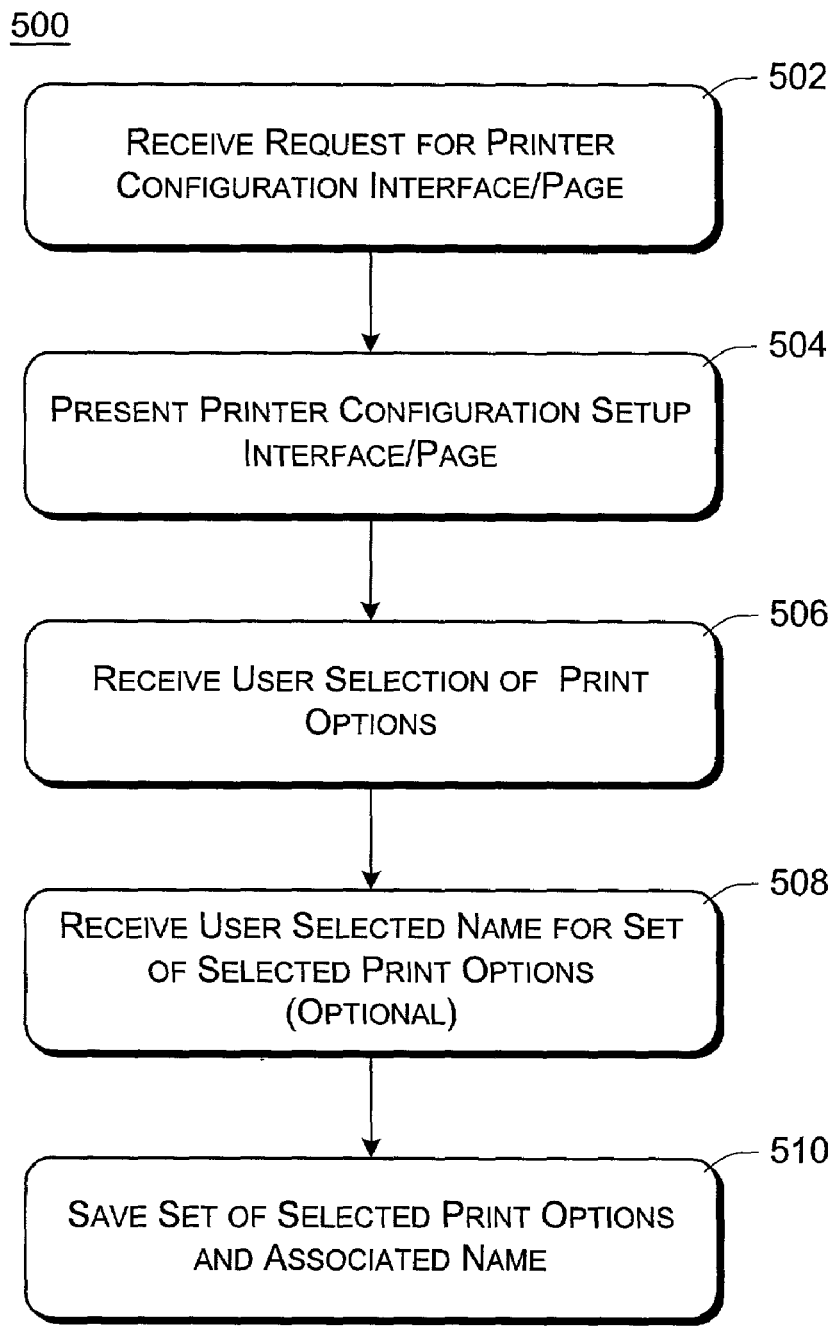
FIG. 9 is a flowchart illustrating an exemplary process for defining printer configurations.

FIG. 9 is a flowchart illustrating an exemplary process 500 for defining printer configurations. The process of FIG. 9 is performed by device content from a printer or print service and involves interaction between the client and the printer or print service. The process 500 may optionally be implemented in software.

Initially, a request is received for a printer configuration interface or page (act 502). In response to the request, a printer configuration setup interface (e.g., a web page) is presented for display to the user (act 504). The user selection of one or more of the print options is then received (act 506), as is (optionally) a user-selected name for the configuration (act 508). If the user does not select a name for the configuration then a default name may be applied (alternatively, the user may be required to select a name for the configuration). The user-selected print options are then saved along with the user-selected name (act 510), allowing the user-defined configuration to be subsequently selected (by name) by the user when printing a document.

Figure 10:
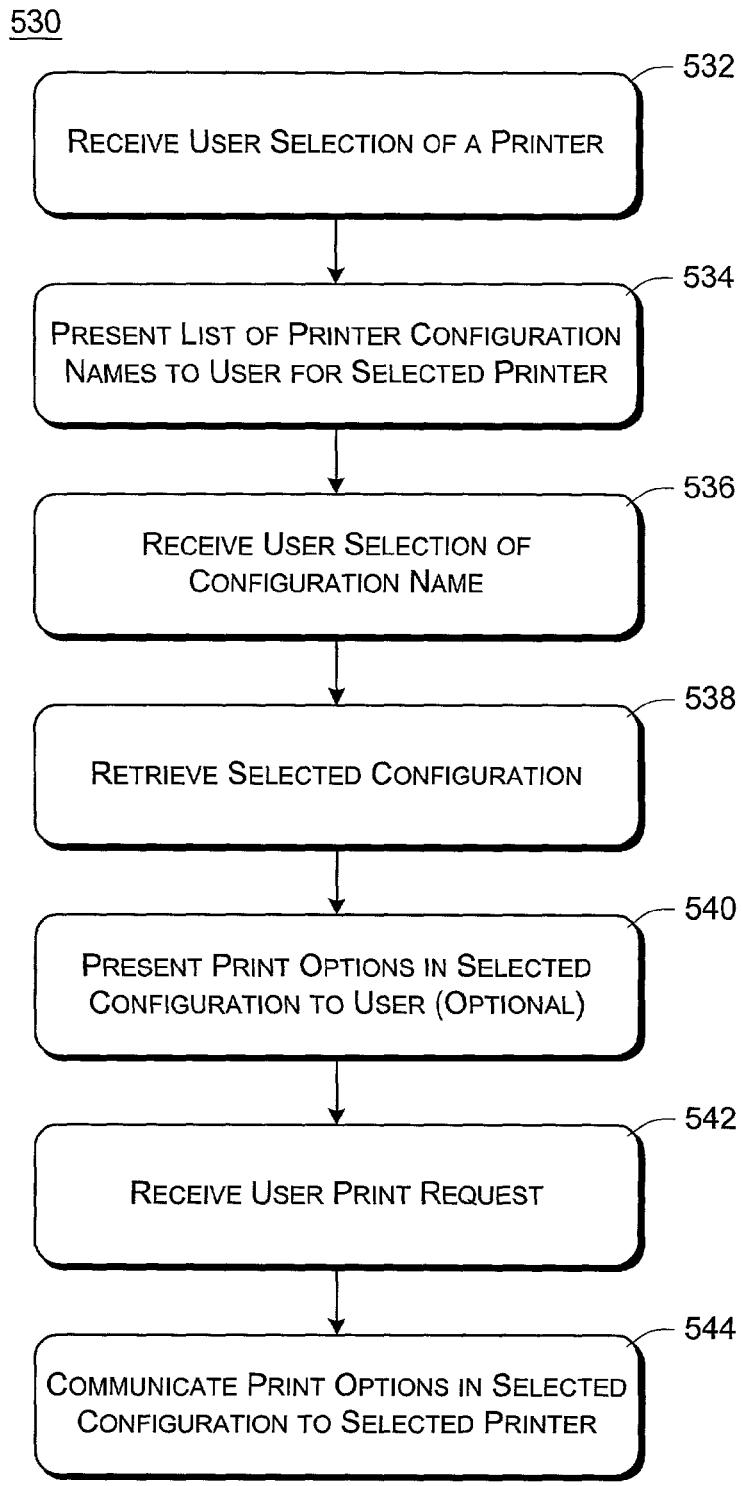
FIG. 10 is a flowchart illustrating an exemplary process for printing using defined printer configurations.

FIG. 10 is a flowchart illustrating an exemplary process 530 for printing using defined printer configurations. The process of FIG. 10 is performed by device content from a printer or print service and involves interaction between the client and the printer or print service. The process 530 may optionally be implemented in software.

Initially, user selection of a printer is received (act 532). A list of printer configuration names for the selected printer is then presented to the user (act 534). A user-selection of one of the configuration names is received (act 536) and the selected configuration retrieved (act 538). Optionally, a default configuration name may be used in the event the user does not select a configuration name. The print options in the selected configuration set are optionally presented to the user (act 540) and a user print request is received (act 542). The print options in the selected configuration are then communicated (if necessary) to the selected printer (act 544).

Figure 11:
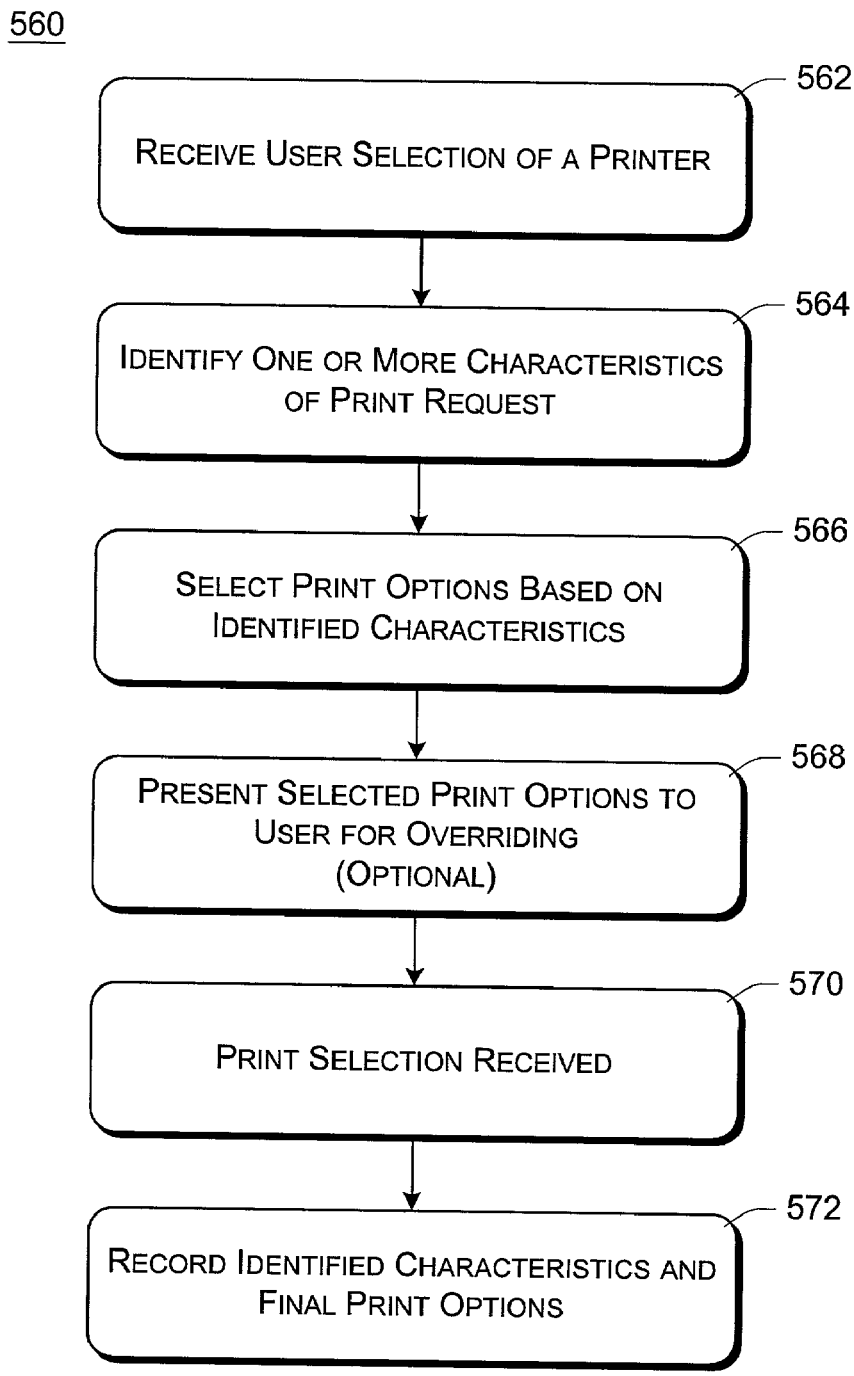
FIG. 11 is a flowchart illustrating an exemplary process for printing using automatically selected print option configurations.

FIG. 11 is a flowchart illustrating an exemplary process 560 for printing using automatically selected print option configurations. The process of FIG. 11 is performed by a printer or print service selected in the process, and may optionally be implemented in software.

Initially, a user selection of a printer is received (act 562). One or more characteristics of the print request are then identified (act 564), and a print option configuration is selected based on the identified characteristics (act 566). The print options in the selected configuration are optionally presented to the user for overriding (act 568), and the print indication (e.g., selection of a "print now" button) is received (act 570). The characteristics identified in act 564, as well as the final print options used for printing the image, are then recorded (act 572).

Various acts are illustrated in the processes of FIGS. 9, 10, and 11 above. However, no particular required order is to be associated with the acts based on their order of presentation in FIGS. 9, 10, and 11. The acts may be performed in different orders than they are presented in FIGS. 9, 10, and 11, and multiple acts may be performed concurrently (or partly concurrently).

Figure 12:
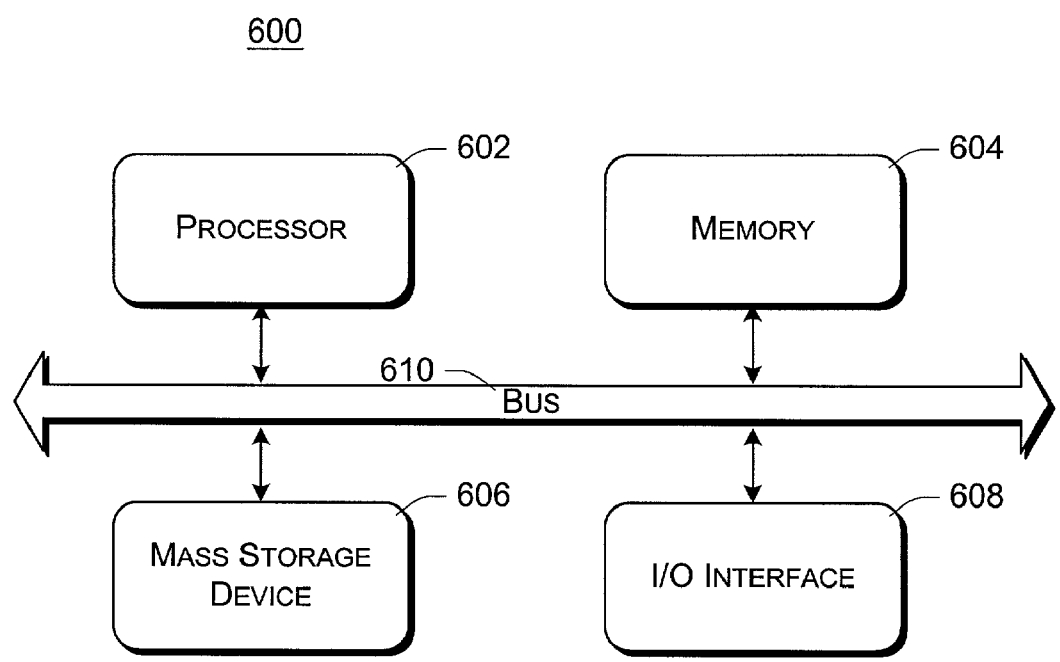
FIG. 12 illustrates an exemplary computer system in additional detail.

FIG. 12 illustrates an exemplary computer system 600 in additional detail. Computer system 600 can be, for example, a network client 102 of FIG. 1, an imaging client 152 or server 154 or 156 of FIG. 2, an imaging client 202, server 210 or 222 of FIG. 3, etc. Computer system 600 represents a wide variety of computing devices, such as desktop computers, portable computers, dedicated server computers, multi-processor computing devices, cellular telephones, personal digital assistants (PDAs), handheld or pen-based computers, microcontroller-based electronic devices, gaming consoles, and so forth.

Computer system 600 includes a processor 602, a memory 604, a mass storage device 606, and an input/output (I/O) interface 608, all coupled to a bus 610. Bus 610 represents one or more buses in computer system 600, such as a system bus, processor bus, accelerated graphics port (AGP), peripheral component interconnect (PCI), and so forth. The bus architecture can vary by computing device as well as by manufacturer. I/O interface 608 is a conventional interface allowing components of system 600 (e.g., processor 602) to communicate with other computing devices via a network, such as network 158 of FIG. 2. I/O interface 608 may be, for example, a modem, a network interface card (NIC), and so forth.

Memory 604 represents volatile and/or nonvolatile memory used to store instructions and data for use by processor 602. Typically, instructions are stored on a mass storage device 606 (or nonvolatile memory) and loaded into a volatile memory 604 for execution by processor 602. Additional memory components may also be involved, such as cache memories internal or external to processor 602. Various embodiments of the invention may be implemented, at different times, in any of a variety of computer readable media that is part of, or readable by, system 600. For example, such computer readable media may be mass storage device 606, memory 604 or a cache memory, a removable disk (not shown) that is accessible by processor 602 or another controller of system 600 (such as a magnetic disk or optical disk), and so forth.

Computer system 600 is exemplary only. It is to be appreciated that additional components (not shown) can be included in system 600 and some components illustrated in system 600 need not be included. For example, a display adapter, additional processors or storage devices, additional I/O interfaces, and so forth may be included in system 600, or mass storage device 606 may not be included.

I/O interface 608 is a conventional interface allowing components of system 600 (e.g., processor 602) to communicate with other computing devices via a network, such as network 158 of FIG. 2.

The discussions herein refer primarily to software components and modules that can be executed by a computing device. It is to be appreciated, however, that the components and processes described herein can be implemented in software, firmware, hardware, or a combination thereof. By way of example, a programmable logic device (PLD) or application specific integrated circuit (ASIC) could be configured or designed to implement various components and/or processes discussed herein.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. One or more computer readable media having stored thereon a plurality of instructions that, when executed by one or more processors, causes the one or more processors to perform acts including:
   receiving, from a client computing device, a request to print an image on a remote printing device, wherein a printer driver for the printing is not installed on the client computing device; and
   applying one or more print options when printing the image, where the one or more print options are automatically selected based at least in part on one or more characteristics of the request and based on a user print history that includes previous print option selections.

2. One or more computer readable media as recited in claim 1, wherein the one or more print options are identified by user-selection of a named print option configuration.

3. One or more computer readable media as recited in claim 1, wherein the one or more print options arc automatically identified by the remote printing device.

4. One or more computer readable media as recited in claim 1, wherein the characteristics comprise at least one or more characters in a name of the document.

5. One or more computer readable media as recited in claim 1, wherein the characteristics comprise at least a size of the document.

6. One or more computer readable media as recited in claim 1, wherein the one or more print options arc automatically identified by comparing the characteristics to a set of rules that map characteristics to print options.

7. One or more computer readable media as recited in claim 6, wherein the set of rules comprises at least one user-defined rule.

8. One or more computer readable media as recited in claim 1, wherein the one or more print options are automatically identified by a print service associated wit the remote printing device.

9. One or more computer readable media as recited in claim 1, wherein the one or more print options are automatically identified by the remote printing device, and further comprising allowing a user of the client computing device to override the automatically identified print options.

10. A method comprising:
    receiving a user-selection of print options associated with a print service accessible to a client computing device, wherein the print service represents an associated printer;
    storing, remotely from the client computing device, the user-selected print options along with a user-identified name for the print options; and
    subsequently receiving a print request without print options and automatically selecting a set of print options from the user-selected print options to print a document identified in the print request, wherein the set of print options are automatically selected based at least in part on one or more characteristics of the print request.

11. A method as recited in claim 10, further comprising allowing the receiving and storing without requiring a printer driver for a printer corresponding to the print service to be installed on the client computing device.

12. A method comprising:
    receiving, from a client computing device, a request to print an image and an identifier of a sot of print options;
    analyzing previous print requests to identify patterns in characteristics of the previous print requests and corresponding print options; and
    automatically identifying print options for processing the request based on the analyzing and the set of print options associated with the identifier.

13. A method comprising:
    receiving a print request identifying a document to be printed; and
    automatically selecting, based at least in part on one or more characteristics of the print request, a set of print options to be used when printing the document, where the print options are not included with the print request.

14. A method as recited in claim 11, wherein the automatically selecting is based on the one or more characteristics of the print request and a user print history associated with the one or more characteristics.

15. A method as recited in claim 13, wherein receiving the print request comprises receiving the print request at a printer.

16. A method as recited in claim 13, wherein receiving the print request comprises receiving the print request at a print service associated with a printer.

17. A method as recited in claim 13, wherein automatically selecting the set of print options comprises identifying a print option configuration by name that includes the set of print options.

18. A method as recited in claim 13, wherein the characteristics comprise at least one or more characters in a name of the document.

19. A method as recited in claim 13, wherein the characteristics comprise at least a size of the document.

20. A method as recited in claim 13, wherein automatically selecting the set of print options comprises comparing the characteristics to a set of rules that map characteristics to print options.

21. A method as recited in claim 20, wherein the set of rules comprises at least one user-defined rule.

22. A method as recited in claim 13, further comprising analyzing previous print requests to identify patterns in characteristics of the previous print requests and corresponding print options.

23. A method as recited in claim 22, wherein automatically selecting the set of print options comprises automatically selecting the set of print options based at least in part on both the identified patterns and the one or more characteristics of the print request.

24. A method as recited in claim 13, further comprising allowing the user to override the automatically selected print options.

25. A system comprising:
    a web server allowing an imaging client to communicate a print request to a printer corresponding to the web server; and
    an auto-select module configured to automatically select one or more print options to be used when printing an image identified by the print request;
    wherein the auto-select module is configured to use a user print history that stores, for a plurality of previous print requests, characteristics of each print request and print options used in printing each print request, and wherein the user print history is used by the auto-select module to automatically select the one or more print options.

26. A system as recited in claim 25, wherein the auto-select module includes a set of one or more rules that map print request characteristics to print options, and wherein the set of one or more rules are used by the auto-select module to automatically select the one or more print options.

27. A system as recited in claim 25, wherein the auto-select module includes a print option selector configured to analyze the print request and identify one or more characteristics of the print request, and wherein the one or more characteristics are used by the auto-select module to automatically select the one or more print options.

* * * * *

UNITED STATES PATENT AND TRADEMARK OFFICE
CERTIFICATE OF CORRECTION

PATENT NO. : 7,190,467 B2  
APPLICATION NO. : 09/905238  
DATED : March 13, 2007  
INVENTOR(S) : Shell Sterling Simpson et al.

Page 1 of 1

It is certified that error appears in the above-identified patent and that said Letters Patent is hereby corrected as shown below:

In column 15, line 19, in Claim 3, delete "arc" and insert -- are --, therefor.

In column 15, line 28, in Claim 6, delete "arc" and insert -- are --, therefor.

In column 15, line 36, in Claim 8, delete "wit" and insert -- with --, therefor.

In column 15, line 64, in Claim 12, delete "sot" and insert -- set --, therefor.

In column 16, line 11, in Claim 14, delete "claim 11" and insert -- claim 13 --, therefor.

Signed and Sealed this

Eleventh Day of August, 2009

David J. Kappos
*Director of the United States Patent and Trademark Office*